(12) United States Patent
Wurster et al.

(10) Patent No.: US 12,162,204 B2
(45) Date of Patent: Dec. 10, 2024

(54) ELECTRIC HEATED BASE FOR CONTAINER BLOW-MOLDING DEVICE

(71) Applicant: AMCOR RIGID PACKAGING USA, LLC, Ann Arbor, MI (US)

(72) Inventors: Michael Wurster, Chelsea, MI (US);
G. David Lisch, Jackson, MI (US);
Luke A. Mast, Brooklyn, MI (US);
Aaron Teitlebaum, Sylvania, OH (US);
Richard Steih, Jackson, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 185 days.

(21) Appl. No.: 17/603,223

(22) PCT Filed: Apr. 14, 2020

(86) PCT No.: PCT/US2020/028037
§ 371 (c)(1),
(2) Date: Oct. 12, 2021

(87) PCT Pub. No.: WO2020/214544
PCT Pub. Date: Oct. 22, 2020

(65) Prior Publication Data
US 2022/0184873 A1    Jun. 16, 2022

Related U.S. Application Data

(60) Provisional application No. 62/834,109, filed on Apr. 15, 2019.

(51) Int. Cl.
*B29C 49/48*    (2006.01)
*B29C 49/12*    (2006.01)
*B29C 49/78*    (2006.01)

(52) U.S. Cl.
CPC .......... *B29C 49/4823* (2013.01); *B29C 49/12* (2013.01); *B29C 49/786* (2013.01);
(Continued)

(58) Field of Classification Search
CPC ... B29C 49/4823; B29C 49/12; B29C 49/786; B29C 49/78; B29C 2049/4825; B29C 2049/4848; B29C 49/28
See application file for complete search history.

(56) References Cited

U.S. PATENT DOCUMENTS 3,746,204 A    7/1973   Nagai
3,994,651 A    11/1976  Kamibayashi
(Continued)

FOREIGN PATENT DOCUMENTS

CN    109397668 A    3/2019
CO    5720991 A2     1/2007
(Continued)

OTHER PUBLICATIONS

International Search Report and Written Opinion of the ISA issued in PCT/US2020/028037, mailed Jul. 27, 2020; ISA/KR.
(Continued)

*Primary Examiner* — Alison L Hindenlang
*Assistant Examiner* — Shibin Liang
(74) *Attorney, Agent, or Firm* — Harness, Dickey & Pierce, P.L.C.

(57) ABSTRACT

A device for blow molding a container from a preform. The device includes a mold base and a pedestal for supporting the mold base. An electric heating element is beneath the mold base for heating the mold base. An insulator is between the heating element and the pedestal.

24 Claims, 8 Drawing Sheets

(52) U.S. Cl.
CPC ............... *B29C 2049/4825* (2013.01); *B29C 2049/4848* (2013.01); *B29C 49/78* (2013.01)

(56) References Cited

U.S. PATENT DOCUMENTS

| | | |
|---|---|---|
| 4,104,769 A | 8/1978 | Levy et al. |
| 4,451,422 A | 5/1984 | Yui et al. |
| 4,871,507 A * | 10/1989 | Ajmera ................... B29C 49/64 264/528 |
| 4,891,178 A | 1/1990 | Ajmera et al. |
| 5,073,330 A | 12/1991 | Nishio et al. |
| 5,478,229 A | 12/1995 | Kato et al. |
| 9,079,352 B2 | 7/2015 | Sumi et al. |
| 10,232,545 B2 | 3/2019 | Maki et al. |
| 2002/0157763 A1 | 10/2002 | Domanico |
| 2003/0141609 A1 | 7/2003 | Jia |
| 2004/0149733 A1 * | 8/2004 | Abbott ..................... H05B 3/58 219/535 |
| 2007/0096362 A1 | 5/2007 | Feichtenschlager et al. |
| 2008/0044603 A1 * | 2/2008 | Hutchinson ............. B29C 51/04 264/325 |
| 2008/0054527 A1 | 3/2008 | Kang |
| 2013/0273264 A1 | 10/2013 | Mourou et al. |
| 2017/0050361 A1 | 2/2017 | Kato et al. |
| 2017/0072617 A1 * | 3/2017 | Maki ....................... B29C 49/28 |
| 2022/0184873 A1 | 6/2022 | Wurster et al. |

FOREIGN PATENT DOCUMENTS

| | | | |
|---|---|---|---|
| EP | 0251340 B1 | 3/1997 | |
| EP | 2303548 B1 | 10/2012 | |
| EP | 3956122 A1 | 2/2022 | |
| JP | 2017124571 | * 7/2017 | ............ B29C 49/48 |
| JP | 2019018514 A | 2/2019 | |
| WO | 2020214544 A1 | 10/2020 | |

OTHER PUBLICATIONS

Supplementary European Search Report Issued in Corresponding EP Patent Application No. 20 79 1273 Dated Dec. 15, 2022.
Office Action issued in corresponding Colombian Patent Application NC2021/0013466 dated Jan. 22, 2024.
Office Action issued in corresponding Canadian Patent Application 3133806 dated Feb. 15, 2024.

* cited by examiner

ELECTRIC HEATED BASE FOR CONTAINER BLOW-MOLDING DEVICE

CROSS-REFERENCE TO RELATED APPLICATIONS

This application is a U.S. National Phase Application under 35 U.S.C. 371 of International Application No. PCT/US2020/028037, filed on Apr. 14, 2020, which claims the benefit of U.S. Provisional Application No. 62/834,109 filed on Apr. 15, 2019. The entire disclosures of the above applications are incorporated herein by reference.

FIELD

The present disclosure relates to an electric heated base for a container blow-molding device.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is cloudy or opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately one (1) to five (5) seconds. Manufacturers of PET juice bottles, which must be hot-filled at approximately 190° F. (88° C.), currently use heat setting to produce PET bottles having an overall crystallinity in the range of approximately 25%-35%.

The container is blow-molded into a mold including a mold base, which in some existing molding machinery is heated. While current mold base heating systems are suitable for their intended use, they are subject to improvement. For example, some current systems include heated or cooled oil that is plumbed up through a lower portion of a pedestal that the mold base is supported by, thereby heating the entire pedestal, which is inefficient and may cause premature wear. Due to component restrictions, the maximum heating temperature is undesirably restricted. Thus higher performance products, which require higher base mold temperatures, cannot be formed using oil heated bases.

Current electrically heated bases also suffer many disadvantages. For example, current electrically heated bases often include a band heater wrapped around the base pedestal, a coil heater snaked through a portion of the pedestal, or cartridge heaters positioned in various arrangements within the assembly. Current electrically heated bases also, similar to oil heated bases, heat the entire pedestal assembly along with any components within the assembly, which is inefficient.

The present disclosure provides for mold base heaters that are more efficient and effective as compared to existing heaters. One skilled in the art will appreciate that the heaters of the present disclosure provide numerous additional advantages and unexpected results.

SUMMARY

This section provides a general summary of the disclosure, and is not a comprehensive disclosure of its full scope or all of its features.

The present disclosure includes a device for blow molding a container from a preform. The device includes a mold base and a pedestal for supporting the mold base. A heating element is beneath the mold base for heating the mold base. An insulator is between the heating element and the pedestal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
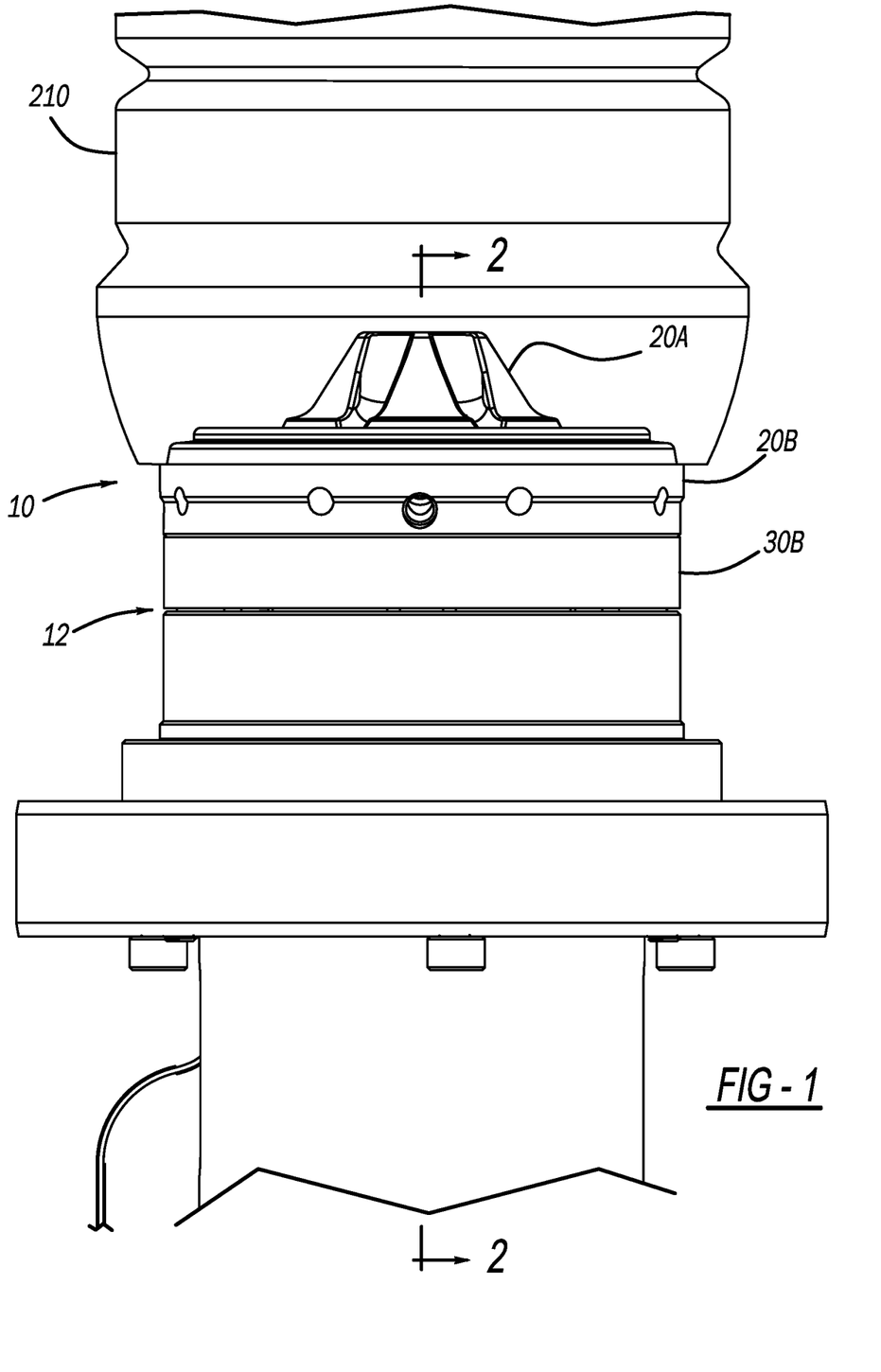
FIG. 1 illustrates a device for blow-molding a container from a preform, the device including a mold base and a heating element in accordance with the present disclosure.
Figure 2:
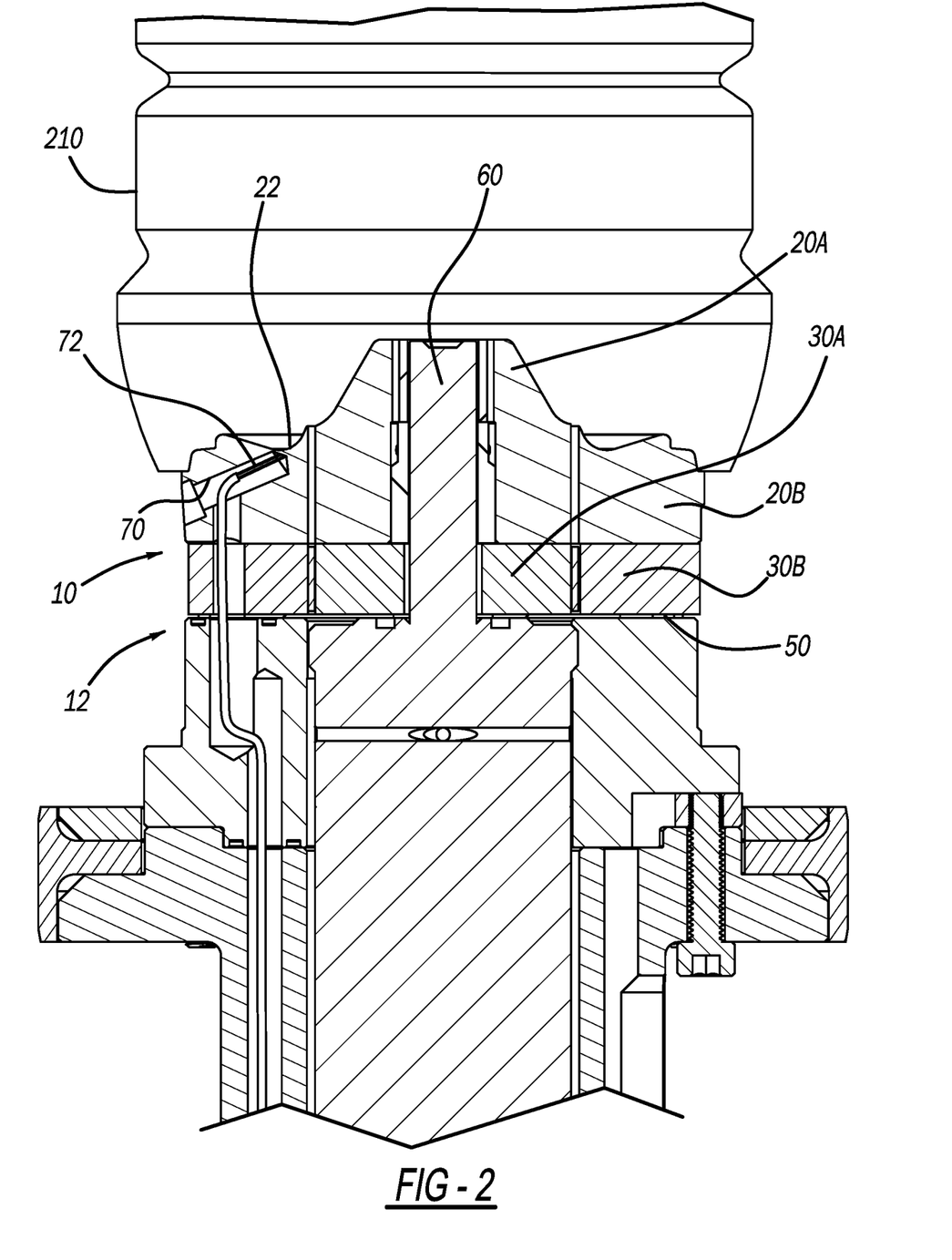
FIG. 2 is a cross-sectional view taken along line 2-2 of FIG. 1.

FIGS. 1 and 2 illustrate a blow molding device 10 for blow molding a container 210 from a preform. The container 210 can be any suitable container blown from any suitable polymeric material. The container 210 can have any suitable size and shape. The container 210 can be configured to store any suitable commodity.

The blow-molding device 10 includes a pedestal 12, which supports a mold base 20A, 20B. The preform is blown against the mold base 20A, 20B to form a base of the container 210. In the example illustrated, the mold base includes an inner mold portion 20A and an outer mold portion 20B. The mold base 20A, 20B may alternatively be formed as a single monolithic part.

Beneath the mold base 20A, 20B is a case 30A, 30B. In the example illustrated, the case includes an inner case portion 30A and an outer case portion 30B. The inner case portion 30A supports the inner mold portion 20A, and the outer case portion 30B supports the outer mold portion 20B. The case 30A, 30B may alternatively be formed as a single monolithic part. The case 30A, 30B may be formed of any suitable material, such as aluminum. The inner case portion 30A may define a hole for an optional stretch rod 60.

Figure 3A:
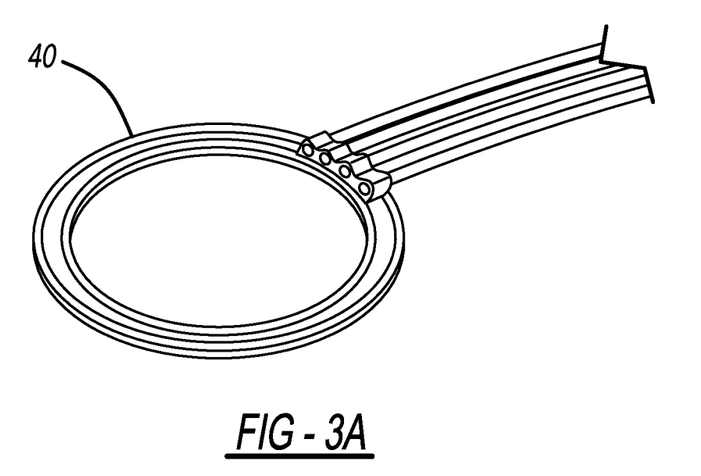
FIG. 3A is a perspective view of an exemplary heating element in accordance with the present disclosure for heating the mold base of the device of FIG. 1.
Figure 3B:
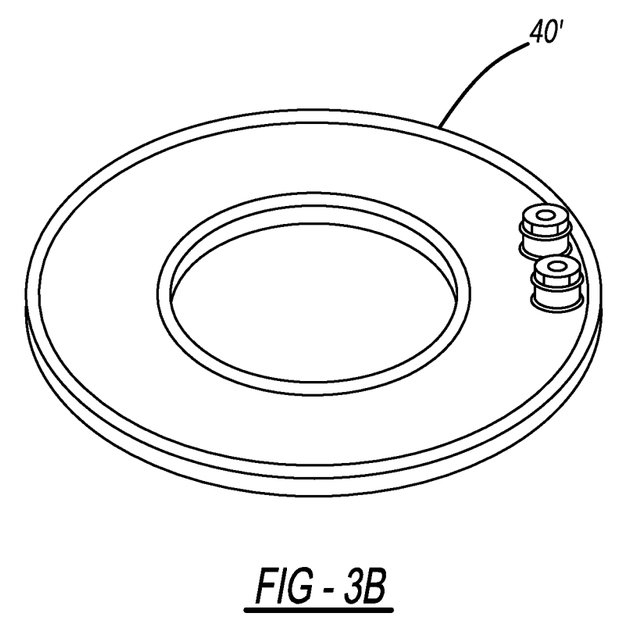
FIG. 3B is a perspective view of an additional heating element in accordance with the present disclosure.

The blow molding device 10 includes a heating element for heating the mold base 20A, 20B. The heating element may be any suitable heating element, such as an electric heating element 40 as illustrated in FIG. 3A, or an electric heating element 40' as illustrated in FIG. 3B, for example. The heating element 40 may be ring-shaped, or have any other suitable shape and configuration. The heating element 40 may be a cast heater cast within the case 30A, 30B, a cartridge heating element, or any other suitable heating element. Optionally, the heating element 40 may be incorporated directly into the mold base 20A, 20B thereby eliminating the need for the case 30A, 30B.

Figure 4:
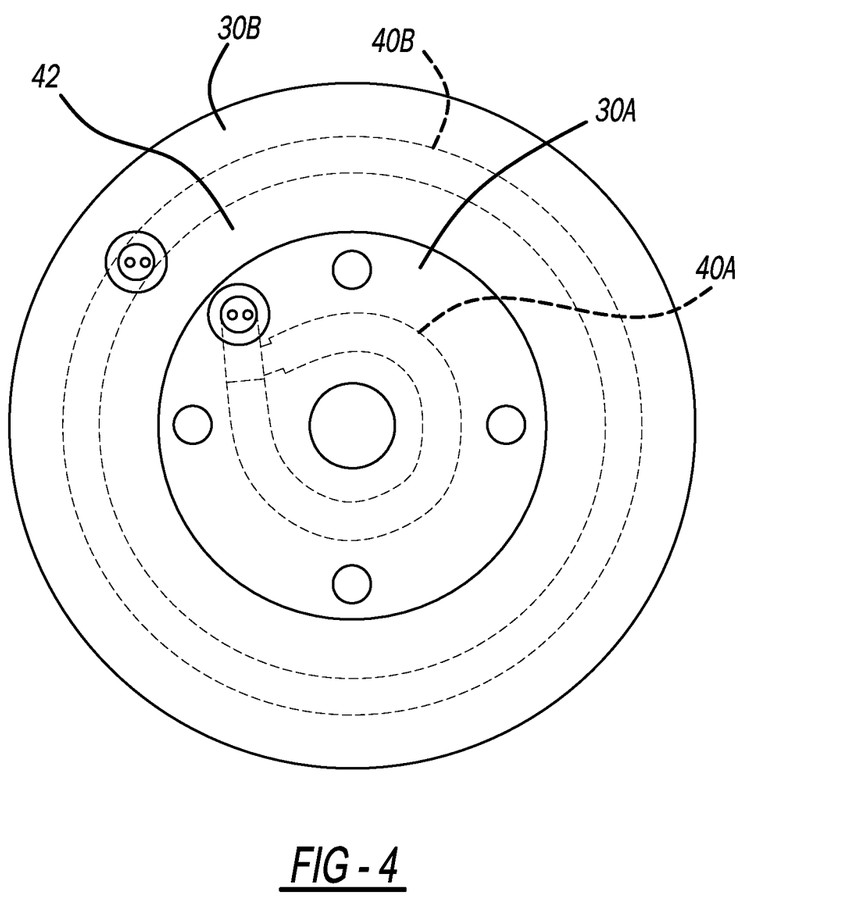
FIG. 4 is a plan view of the heating element of FIG. 3A cast within a case of the device of FIG. 1 along with an additional heating element.

FIG. 4 illustrates the heating element 40 as including two portions that may be heated to different temperatures—an inner heating element 40A and an outer heating element 40B. The inner heating element 40A is cast within the inner case portion 30A, and the outer heating element 40B is cast within the outer case portion 30B. Alternatively, the inner heating element 40A may be cast within the inner mold portion 20A and the outer heating element 40B may be cast within the outer mold portion 20B. The casting materials may be any suitable material. The heating element 40 may be arranged in any other suitable manner and is not limited to a cast heater. The description of the heating element 40 also applies to the heating element 40'. The inner heating element 40A and the outer heating element 40B may be separated by an insulator 42 to minimize heat transfer between the heating elements. The thickness of the insulator 42 can be any suitable thickness such as 0.005" to 0.050", or preferably about 0.020".

The case 30A, 30B is arranged between the mold base 20A, 20B and an insulator 50. The insulator 50 insulates portions of the pedestal 12 beneath the case 30A, 30B from being heated, which provides numerous advantages including conserving energy and reducing premature wear of components below the insulator 50. Any suitable insulator 50 can be used, such as a thin FRP-type material (fiber reinforced polymer) or NOMEX®. In lieu of, or in addition to, the insulator 50 may be an isolated air gap created by a ring, spacer, or other suitable component. The insulator may be placed adjacent to the case 30A, 30B or it can be separated from the case 30A, 30B by additional components. The thickness of the insulator 50 can be any suitable thickness such as 0.005" to 0.050", or preferably about 0.020".

The pedestal 12 is movable to move the case 30A, 30B the insulator 50, and the mold base 20A, 20B along a longitudinal axis of the device 10. The pedestal 12 may define channels extending therethrough. The channels may be channels traditionally used for oil cooling. The present disclosure provides for use of the channels to water cool the base 20A, 20B by directing water through the channels.

Each one of the inner mold portion 20A, the inner case portion 30A, and the insulator 50 define an opening through which the stretch rod 60 may extend. The stretch rod 60 is actuated to facilitate forming of the container 210, as is known in the art. In some applications, various air gaps may be defined between mounting screws and other components of the device 10. The blow molding device 10 may also incorporate base blow off.

Any suitable temperature sensor may be included for measuring temperature of the mold base. Any suitable number of temperature sensors may be included and arranged at any suitable positions. For example, when the mold base includes the inner mold portion 20A and the outer mold portion 20B, an inner temperature sensor may be included with the inner mold portion 20A and an outer temperature sensor may be included with the outer mold portion 20B. The temperature sensor may be at an outer surface 22 of the mold base 20A, 20B, or just below the outer surface 22.

FIG. 2 illustrates an exemplary temperature sensor in the form of a thermocouple 72. The thermocouple 72 is seated in a thermocouple well 70 defined by the mold base 20A, 20B. In the example illustrated, the thermocouple 72 is arranged in the outer mold portion 20B. Another thermocouple may be included at the inner mold portion 20A to measure the temperature thereof. The thermocouple 72 may be arranged at any suitable position at or below the outer surface 22, such as about 0.5 mm below the outer surface 22 for example. The thermocouple 72 may be arranged between the heating element 40 and the outer surface 22, for example. The thermocouple 72 may alternatively be embedded in the heating element 40, for example. A thermocouple or other temperature sensor may be similarly arranged to measure temperature of the mold base 20B. The thermocouple 72 can also be part of the heating element 40.

Figure 5:
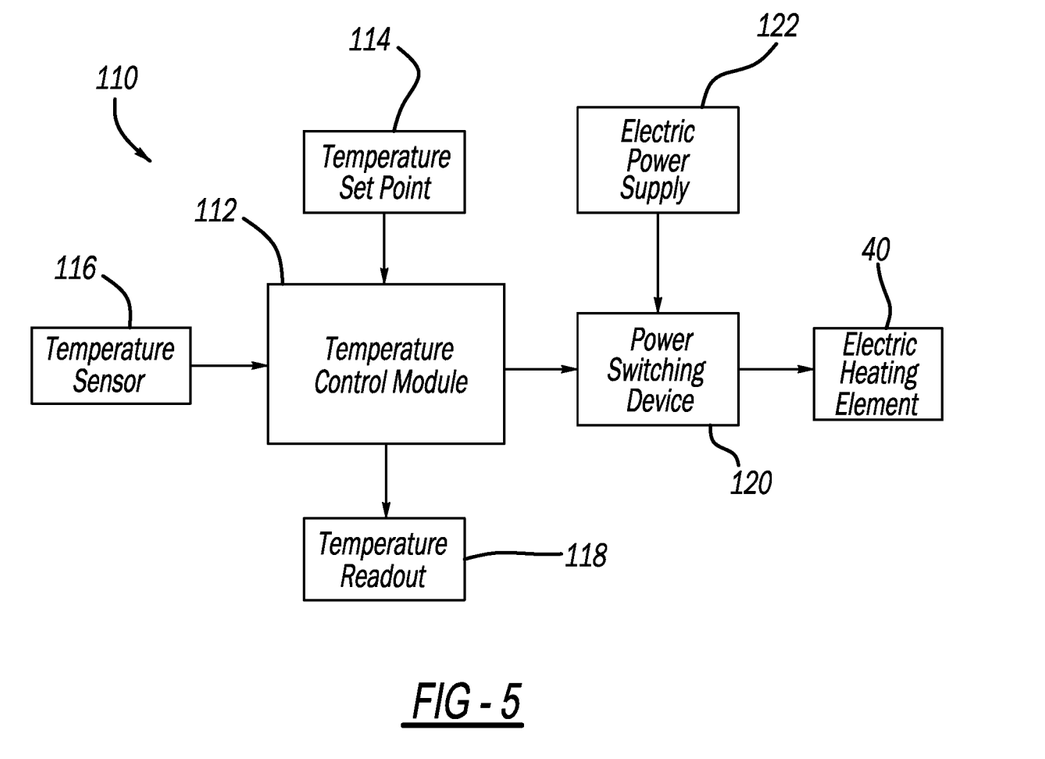
FIG. 5 illustrates exemplary control of the heating element in accordance with the present disclosure.

FIG. 5 illustrates exemplary control of the heating element 40 in accordance with the present disclosure at reference numeral 110. In applications that include both inner heating element 40A and outer heating element 40B, the control 110 may be individually performed for both the inner heating element 40A and the outer heating element 40B so that the inner heating element 40A may be heated to a different temperature than the outer heating element 40B.

The control 110 includes a temperature control module 112. In this application, including the definitions below, the term "control module" or the term "controller" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

At block 114, the control module 112 receives a temperature set point input, which may be a target temperature of the mold base 20A, 20B. At block 116, the control module 112 receives inputs from any suitable temperature sensor indicating the temperature of the mold base 20A, 20B, such as the thermocouple 72. Based on the inputs, the control module 112 generates a temperature readout at block 118. The control module 112 also controls a power switching device at block 120 to bring the heating element 40 to a temperature equal to, or about equal to, the temperature set point set at block 114. The control module 112 is configured to operate the electric heating element 40 to heat the mold base 20A, 20B to bring the temperature of the mold base 20A, 20B to the temperature set point at block 114. The control module 112 is configured to individually control the temperature of the inner heating element 40A and the outer heating element 40B.

The present disclosure advantageously concentrates application of the heat to the mold base 20A, 20B and due to the presence of the insulator 50 the rest of the pedestal 12 is not heated. Concentrating the heat at the mold base 20A, 20B is more efficient as compared to current heating systems, which do not isolate the heat at the mold base and thus often heat the entire pedestal down to the mounting location. Keeping the pedestal 12 cool increases the wear life of components thereof, particularly any moving components or wear items (i.e., the stretch rod 60 and components associated therewith, as well as base stoking cylinder wear items).

Furthermore, the arrangement of the heating element 40 of the present disclosure advantageously allows the mold base 20A, 20B to be heated to higher temperatures (such as compared to traditional oil based heaters), which expands the range of containers 110 that may be formed. Other advantages also include higher than normal heat induced crystallinity, improved material distribution, and lower weigh in the base of the container. In addition to the heating element 40 arranged in the case 30A, 30B, any other suitable existing fluid heating/cooling platform capability can be utilized to further cool the pedestal 12 and other components isolated from heating element 40.

Figure 6:
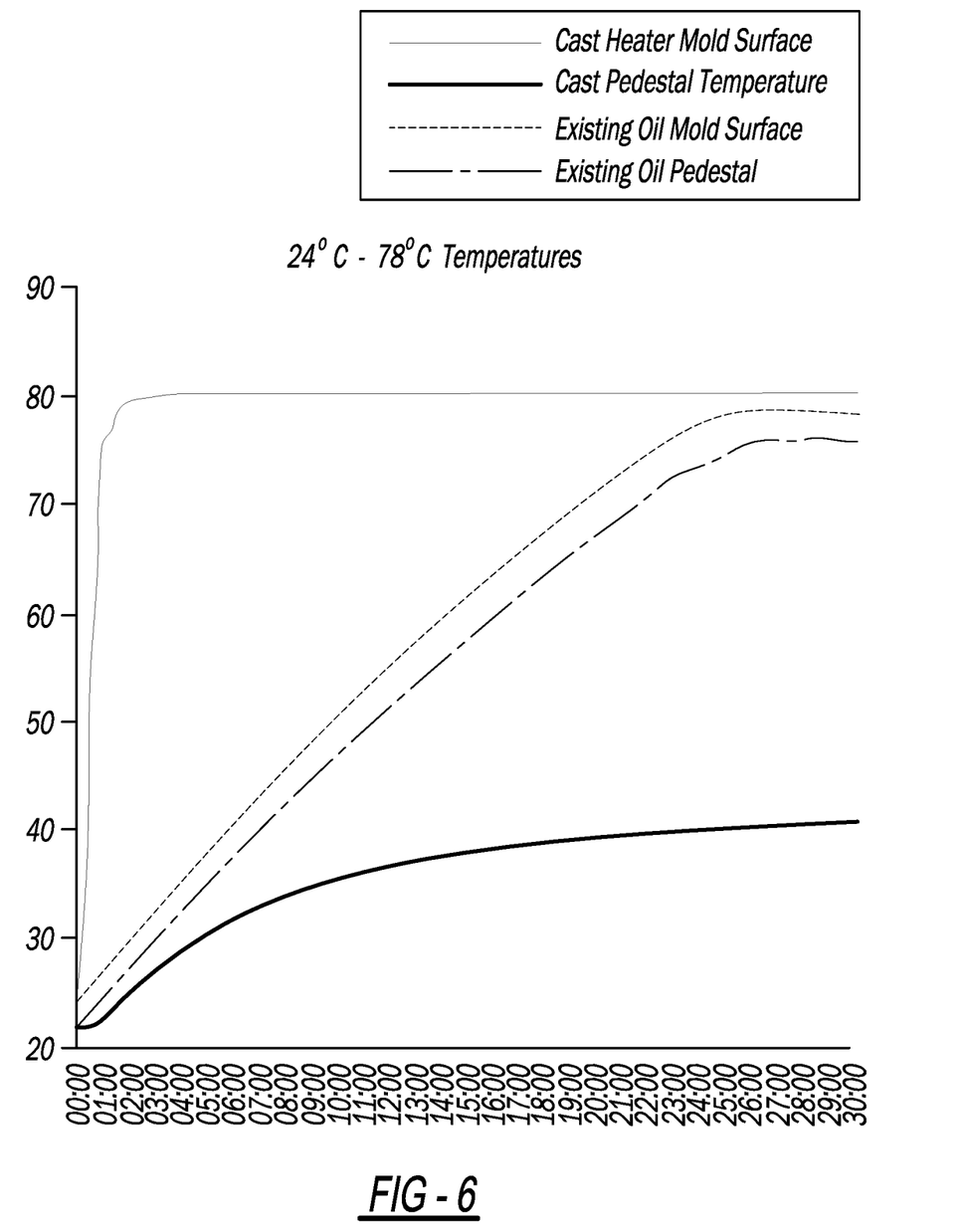
FIG. 6 illustrates exemplary temperature of an outer mold surface of the mold base including the heating element of the present disclosure as compared to temperature of a prior art base heated with oil in the temperature range of 24 C-78 C, and illustrates exemplary temperature of a pedestal heated with the heating element of the present disclosure as compared to temperature of a prior art pedestal heated with oil.
Figure 7:
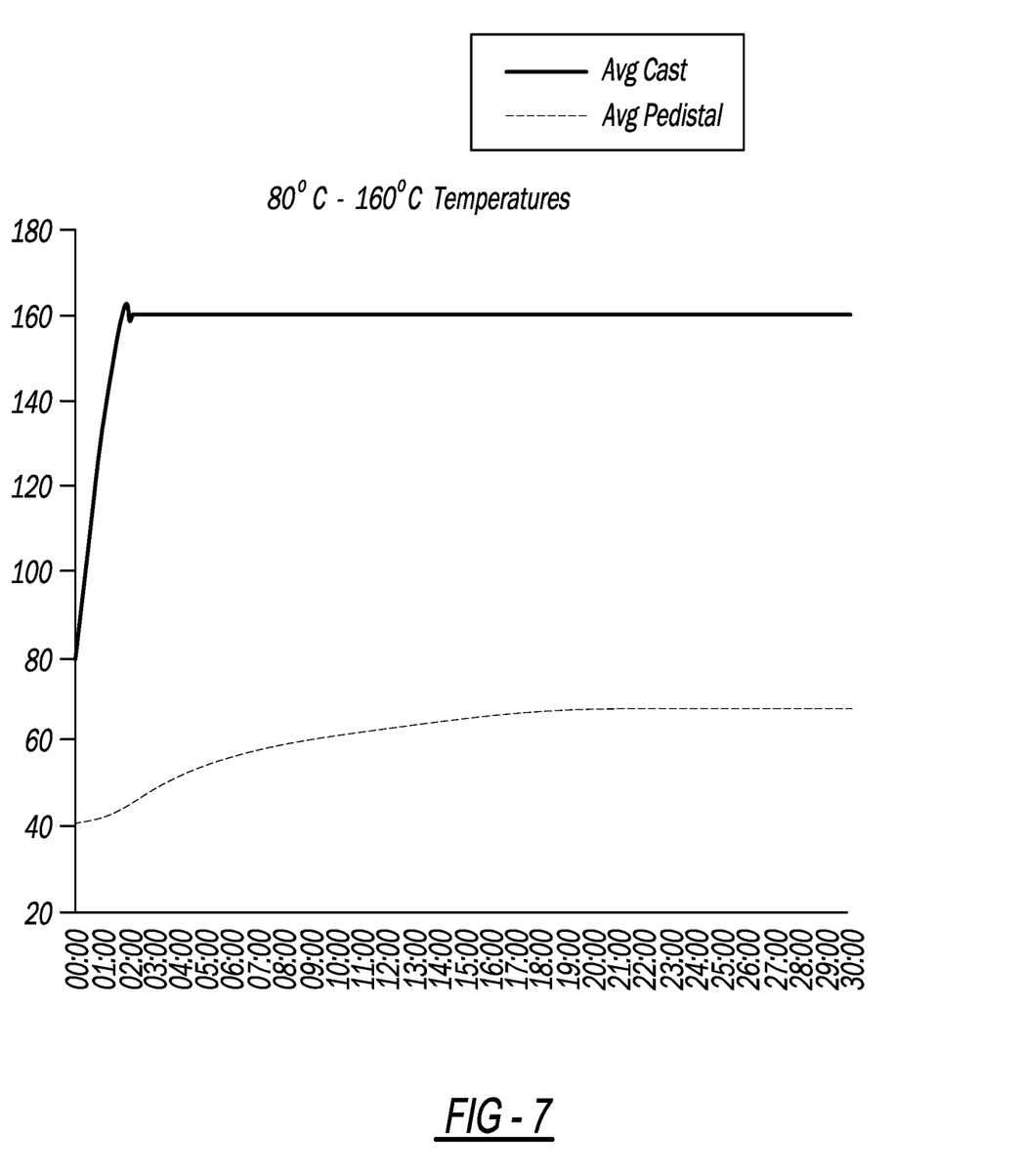
FIG. 7 illustrates average temperature of the mold base with the heating element cast therein in the range of 80 C-160 C and average temperature of the pedestal.
Figure 8:
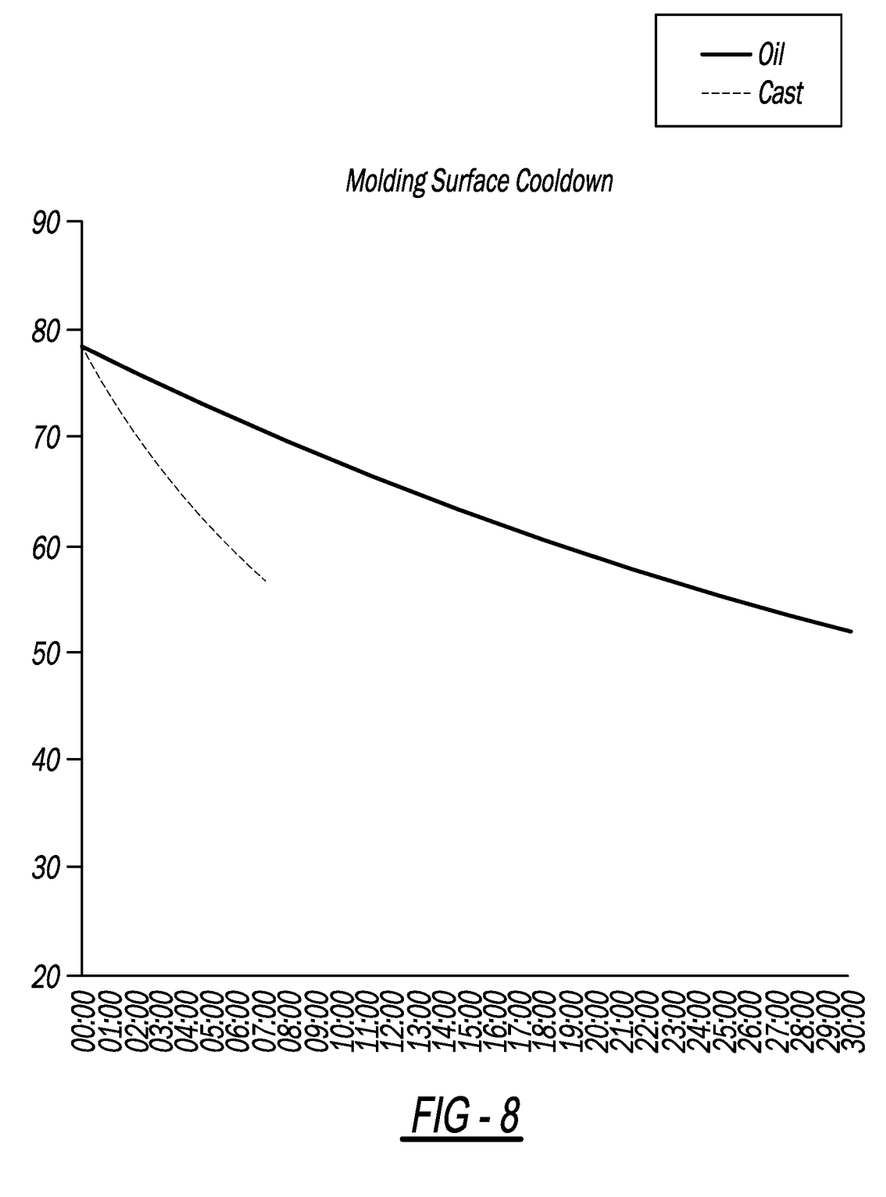
FIG. 8 illustrates exemplary temperature of the mold base heated by the heating element of the present disclosure during cool down as compared to a prior art base heated with oil.

FIGS. 6, 7, and 8 graphically illustrate improvements of the present disclosure as compared to existing heat transfer through oil. FIG. 6 illustrates exemplary temperature of the outer mold surface 22 of the mold base 20A, 20B including the heating element 40, 40' of the present disclosure as compared to temperature of a prior base heated with oil in the temperature range of 24 C-78 C, and illustrates exemplary temperature of the pedestal 12 heated with the heating element 40, 40' of the present disclosure as compared to temperature of a prior pedestal heated with oil. FIG. 7 illustrates average temperature of the mold base 20A, 20B with the heating element 40, 40' cast therein in the range of 80 C-160 C and average temperature of the pedestal 12. FIG. 8 illustrates exemplary temperature of the mold base 20A, 20B heated by the heating element 40, 40' of the present disclosure during cool down as compared to a prior base heated with oil.

As show in FIGS. 6, 7, and 8, the present disclosure advantageously results in greatly reduced time to target mold surface temperature (about 20× improvement) (temperature taken at the mold surface 22 or slightly beneath the mold surface 22, such as about 0.5 mm below). Advantageously, a much cooler temperature of the pedestal 12 (less mass to heat equals greater efficiency, cooler operating conditions for moving components/seals). With the electric heating element 40, the pedestal 12 below the insulator 50 may be cooled with chilled water to further reduce temperature, such as by directing water through passages of the pedestal 12 traditionally used for oil cooling. The heating element 40 also consumes relatively little energy, such as about 60 W at steady state to maintain 80 C, and about 110 W at steady state to maintain 160 C. Faster cooldown is also achieved, such as about 3×'s as fast.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A device for blow molding a container from a preform, the device comprising:
   a mold base including an inner portion and an outer portion, the mold base configured to form only a base of the container from an outer standing ring of the base inward to a center of the base, the mold base confined to an area at and inward of the standing ring of the base, the mold base movable between a retracted position and an extended position during blow molding;
   a pedestal for supporting the mold base;
   a case on which the mold base is seated, the case and the mold base have a common outer diameter such that the mold base does not extend outward beyond the case;
   at least one electric heating element for heating the mold base including an inner electric heating element configured to heat the inner portion of the mold base and an outer electric heating element configured to heat the outer portion of the mold base, both the inner electric heating element and the outer electric heating element are within the case on which the mold base is seated; and
   a first insulator for isolating the heating element;
   wherein the inner electric heating element and the outer electric heating element are configured to be heated at different temperatures.

2. The device of claim 1, wherein the at least one heating element is configured to consume about 60 W at steady state to maintain 80 C.

3. The device of claim 1, wherein the at least one heating element is configured to consume about 110 W at steady state to maintain 160 C.

4. The device of claim 1, wherein the pedestal is configured to be water-cooled.

5. The device of claim 1, further comprising a control module configured to:
   receive an input from a temperature sensor indicating a temperature of the mold base;
   receive a temperature set point indicating a target temperature of the mold base; and
   operate the at least one electric heating element to heat the mold base to bring the temperature of the mold base to the target temperature.

6. The device of claim 1, wherein the first insulator has a thickness of 0.005" to 0.050".

7. The device of claim 1, wherein the first insulator has a thickness of about 0.020".

8. The device of claim 1, wherein the at least one electric heating element is cast within the case.

9. The device of claim 1, wherein the at least one electric heating element is between the first insulator and the mold base.

10. The device of claim 1, wherein the first insulator is an air gap.

11. The device of claim 1, wherein the first insulator is located below the at least one electric heating element.

12. The device of claim 1, wherein the mold base and the pedestal define an opening to accommodate a stretch rod of the device.

13. The device of claim 1, wherein the pedestal actuates the mold base, the at least one electric heating element, and the first insulator along a longitudinal axis of the device.

14. The device of claim 1, further comprising a second insulator between the inner electric heating element and the outer electric heating element.

15. The device of claim 14, wherein the second insulator has a thickness of 0.005" to 0.050".

16. The device of claim 14, wherein the second insulator has a thickness of about 0.020".

17. The device of claim 1, further comprising a temperature sensor configured to measure temperature of the mold base.

18. The device of claim 17, wherein the temperature sensor is at an outer mold surface of the mold base.

19. The device of claim 17, wherein the temperature sensor is beneath an outer mold surface of the mold base.

20. The device of claim 17, wherein the temperature sensor is about 0.5 mm below an outer mold surface of the mold base.

21. The device of claim 17, wherein the temperature sensor is seated in a well defined by the mold base.

22. The device of claim 17, wherein the temperature sensor is a thermocouple.

23. The device of claim 17, wherein the temperature sensor is integrated with the at least one electric heating element.

24. The device of claim 1, further comprising a first temperature sensor configured to measure temperature of the inner portion of the mold base and a second temperature sensor configured to measure temperature of the outer portion of the mold base.

* * * * *